United States Patent
Werner

(10) Patent No.: US 11,644,377 B2
(45) Date of Patent: May 9, 2023

(54) DEVICES, SYSTEMS, AND METHODS FOR TESTING OCCUPANT DETECTION SENSORS

(71) Applicant: Rivian IP Holdings, LLC, Plymouth, MI (US)

(72) Inventor: Nathan Werner, Farmington Hills, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 190 days.

(21) Appl. No.: 17/246,890

(22) Filed: May 3, 2021

(65) Prior Publication Data

US 2022/0349768 A1 Nov. 3, 2022

(51) Int. Cl.
*G01L 25/00* (2006.01)
*B60N 2/00* (2006.01)

(52) U.S. Cl.
CPC .............. *G01L 25/00* (2013.01); *B60N 2/002* (2013.01)

(58) Field of Classification Search
CPC ... G01L 25/00; B60N 2/002; B60R 21/01516; B60R 16/023; B60R 21/0153; G01D 2218/10
See application file for complete search history.

(56) References Cited

U.S. PATENT DOCUMENTS

| 7,348,880 B2* | 3/2008 | Huies .................. B60R 25/1004 340/425.5 |
| 8,659,303 B2* | 2/2014 | Hayakawa ............. B60N 2/002 324/684 |
| 10,249,162 B2* | 4/2019 | Auvenshine ........... B60N 2/002 |
| 2012/0098548 A1* | 4/2012 | Hayakawa ............. B60N 2/002 324/601 |
| 2017/0109987 A1* | 4/2017 | Auvenshine ........... G08B 21/02 |

* cited by examiner

*Primary Examiner* — Freddie Kirkland, III
(74) *Attorney, Agent, or Firm* — Clements Bernard Walker; Christopher L. Bernard

(57) ABSTRACT

Various disclosed embodiments include illustrative devices, systems, and methods for analyzing occupancy detection sensors. In an illustrative embodiment, a device includes a processor and a memory configured to store computer-executable instructions. The instructions are configured to cause the processor to receive an environmental value, send instructions to apply increasing forces to a seat portion of a seat, magnitude of sequential ones of the forces increasing over time, receive applied force values from a force applicator, receive a seat occupied signal from a seat sensor, record the applied force value associated with the applied force values in response to receiving the seat occupied signal, compare the recorded force value with a threshold force value associated with the received environmental value, and output a signal in response to the comparison.

20 Claims, 4 Drawing Sheets

DEVICES, SYSTEMS, AND METHODS FOR TESTING OCCUPANT DETECTION SENSORS

INTRODUCTION

The present disclosure relates to testing of installed occupant detection sensors/switches. The statements in this section merely provide background information related to the present disclosure and may not constitute prior art.

Seat occupancy detection sensors detect when a person is in a vehicle seat. Seat occupancy information is used for other vehicle systems, such as an airbag system. Due to numerous factors, such as temperature or humidity, seat occupancy detection sensors may be triggered within a range of seat weights.

BRIEF SUMMARY

Various disclosed embodiments include illustrative devices, systems, and methods for analyzing occupancy detection sensors.

In an illustrative embodiment, a device includes a processor and a memory configured to store computer-executable instructions. The instructions are configured to cause the processor to receive an environmental value, send instructions to apply increasing forces to a seat portion of a seat, magnitude of sequential ones of the forces increasing over time, receive applied force values from a force applicator, receive a seat occupied signal from a seat sensor, record the applied force value associated with the applied force values in response to receiving the seat occupied signal, compare the recorded force value with a threshold force value associated with the received environmental value, and output a signal in response to the comparison.

In another illustrative embodiment, a system includes an environmental sensor, a force applicator, a processor configured to communicate with the environmental sensor, the force applicator, and an occupant detection sensor in the vehicle seat, a memory configured to communicate with the processor, and an output device. The environmental sensor is configured to generate an environmental value. The force applicator is configured to apply increasing forces to a seat portion of a vehicle seat, magnitude of sequential ones of the forces increasing over time and generate applied force values associated with the applied increasing forces. The instructions are configured to cause the processor to receive the environmental value, receive the generated applied force values from the force applicator, receive a seat occupied signal from the occupant detection sensor, record the applied force value associated with the received applied force values in response to receiving the seat occupied signal, compare the recorded force value with a threshold value associated with the received environmental value, and generate an output signal in response to the comparison. The output device is configured to output the generated output signal.

In another illustrative embodiment, a method includes receiving an environmental value, applying increasing forces to a seat portion of a seat, magnitude of sequential ones of the forces increasing over time, receiving applied force values, receiving a seat occupied signal, recording the applied force value associated with the applied force values in response to receiving the seat occupied signal, comparing the recorded force value with a threshold force value associated with the received environmental value, and outputting a signal in response to the comparison.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
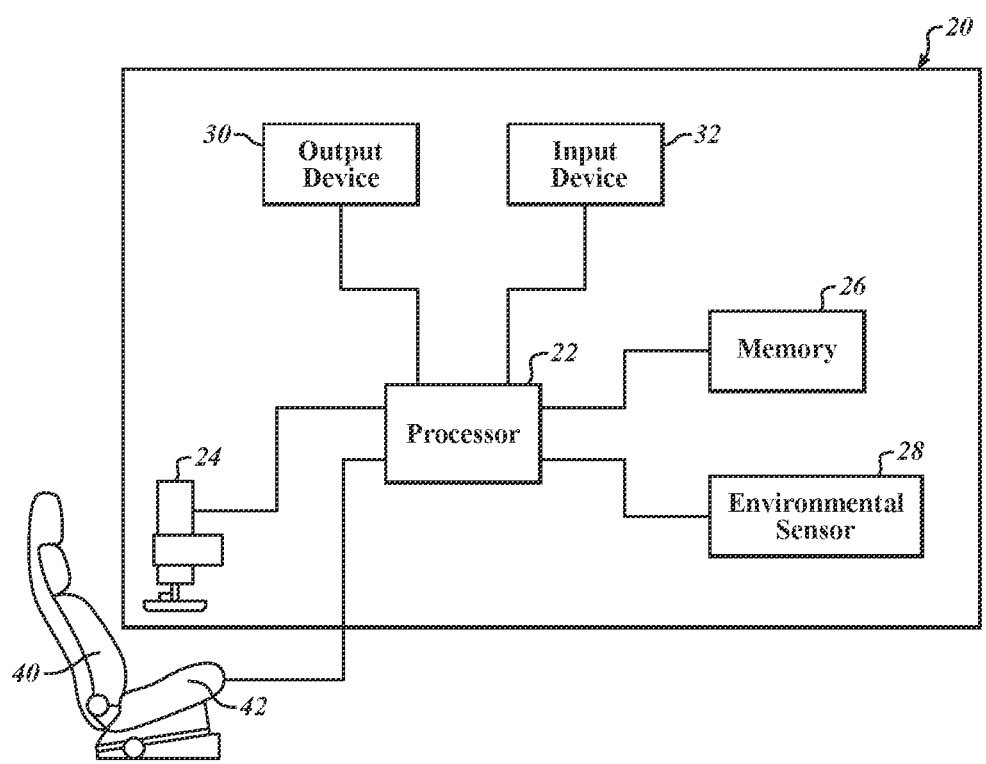
FIG. 1 is an illustration of a system for testing vehicle seat sensors.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative devices, systems, and methods. In such embodiments, illustrative devices, systems, and methods may test occupancy detection sensors.

Referring now to FIG. 1, in various embodiments a system 20 is configured to perform testing of performance of occupant detection sensors 42 of seats 40. In various embodiments, the system 20 includes a processor 22, a force applicator 24, a memory 26, an environmental sensor 28, an output device 30, and an input device 32.

In various embodiments, the environmental sensor 28 is configured to generate an environmental value, such as, without limitation, a temperature value, a humidity value, an air pressure value, or other comparable environment values. In such embodiments, the environmental sensor 28 may include, without limitation, a sensor such as a thermometer, a barometer, a hygrometer, and/or any comparable devices. In some embodiments, a one or more additional environmental sensors (not shown) may be included in the system 20, each configured to generate an environmental value.

In various embodiments, the force applicator 24 is configured to apply increasing forces to a seat portion of a vehicle seat. The magnitude of sequential ones of the applied forces increases over time. The force applicator 24 generates applied force values associated with the applied increasing forces. In various embodiments, the force applicator 24 may include any force applicator as desired for a particular application. For example and given by way of non-limiting example, in various embodiments the force applicator 24 may include, without limitation, any suitable force applicator such as, without limitation, an electric motor actuator, a pneumatic actuator, a hydraulic actuator, or any comparable controllable actuator.

In various embodiments, the processor 22 is configured to communicate with the environmental sensor 28, the force applicator 24, and the occupant detection sensor 42 in the vehicle seat 40 being tested. The memory 26 stores computer-executable instructions. When the instructions are executed by the processor 22, the instructions cause the processor 22 to receive the environmental value from the environmental sensor 28, to receive the generated applied force values from the force applicator 24, and to receive a seat occupied signal from the occupant detection sensor 42. The executed instructions also cause the processor 22 to record the applied force value associated with the received applied force values in response to receiving the seat occupied signal. The recorded force value is compared with a threshold value associated with the received environmental value. An output signal is generated in response to the comparison. The output device 30 outputs the generated output signal or generates an action in response to the generated output signal.

In various embodiments, the memory 26 is further configured to store computer-executable instructions configured to cause the processor 22 to output a pass signal responsive to the recorded force value being greater than a lower threshold value associated with the received environmental value and less than an upper threshold value associated with the received environmental value. The lower threshold value and the upper threshold value are inversely proportional to the environmental value. For example, a higher temperature at the location where the system 20 is being used to test the seat 40 may cause the seat 40 to be more easily compressible, thus resulting in the occupant detection sensor 42 sending a seat occupied signal at a lower applied force value than when the temperature is lower. As such, in this case, a lower threshold is selected when testing under higher temperature conditions.

In various embodiments, the memory 26 is further configured to store computer-executable instructions configured to cause the processor 22 to output a fail signal responsive to the recorded force value being less than the lower threshold value or the recorded force value being greater than the upper threshold value.

In various embodiments, the memory 26 is further configured to store computer-executable instructions configured to cause the processor 22 to receive seat material information. Seat material information may be based on characteristics or conditions of one or more of the seat materials, such as the material density, elasticity, age, or condition. In such examples, the threshold value can be further associated with the received seat material information. For example, a seat having a first type of foam in the seat portion may change resistance over a temperature range at a rate that is greater or less than a seat with a second type of foam.

In various embodiments and given by way of example only and not of limitation, the occupant detection sensor 42 may be a device that is capable of sensing a change of electrical resistance, capacitance, or current. Once that change has reached a threshold amount, a seat occupied signal is generated. Occupant detection sensor/switches are well known in the art and no further explanation is necessary for a person of skill in the art to understand disclosed subject matter.

In various embodiments and given by way of example only and not of limitation, the output device 30 may connect to the processor 22 via a public or a private data network. The output device 30 may include, without limitation, printers, other computers, displays, or comparable devices. The output device 30 may include, without limitation, a light or other indicator that illuminates or changes condition in response to a pass or a fail signal.

In various embodiments and given by way of example only and not of limitation, the input device 32 may include any suitable interface device, such as without limitation, a keyboard, a touchscreen, one or more cursor control devices, a graphical user interface, a voice actuated controller, or any suitably comparable device as desired.

In various embodiments and given by way of example only and not of limitation, the environmental sensor 28 may include without limitation a thermometer, a barometer, a hygrometer, and/or any comparable device. It will be appreciated that, in various embodiments, the environmental sensor 28 may be configured to generate an analog signal or digital signal that identifies the environmental value that is being measured.

In various embodiments and given by way of example only and not of limitation, the force applicator 24 may be an electric motor actuator, a pneumatic actuator, a hydraulic actuator, or any comparable controllable actuator suitably capable of applying an increasing force. Control of the force applicator 24 may be provided by instructions sent from the processor 22 or the force applicator 24. It will be appreciated that, in various embodiments, any suitable controller as desired for a particular application may provide instructions for causing desired control of the force applicator 24. Controllable actuators are extremely well known in the art and no further explanation is necessary for a person of skill in the art to understand disclosed subject matter.

Figure 2:
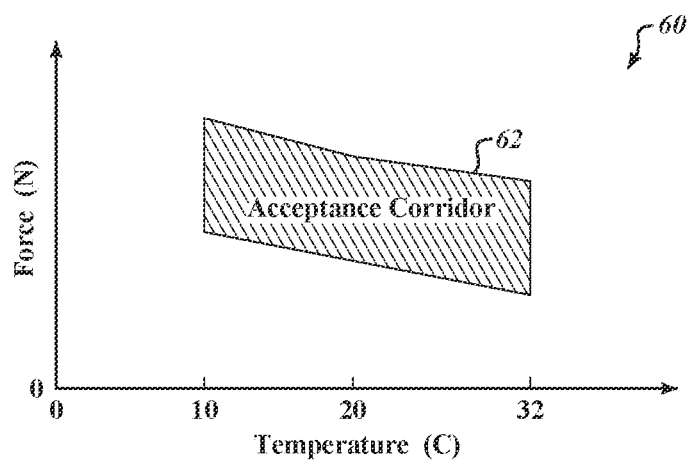
FIG. 2 is a graph of a seat sensor acceptance corridor.

Referring additionally to FIG. 2, in various embodiments, an illustrative force versus temperature (C°) graph 60 includes an acceptance corridor boundary 62 for a seat under test. Those skilled in the art will appreciate that different acceptance corridor boundaries may be used for different environmental values, such as without limitation, humidity, air pressure, or the like. In the example graph 60 shown, acceptance corridor boundary 62 identifies a corridor of acceptable force values within a range of temperatures (e.g., within a 22° range). The limits of the acceptance corridor boundary 62 may be determined from historical analysis of testing of many similar seats with similar occupant detection sensors across a range of temperatures or other environmental values.

Figure 3:
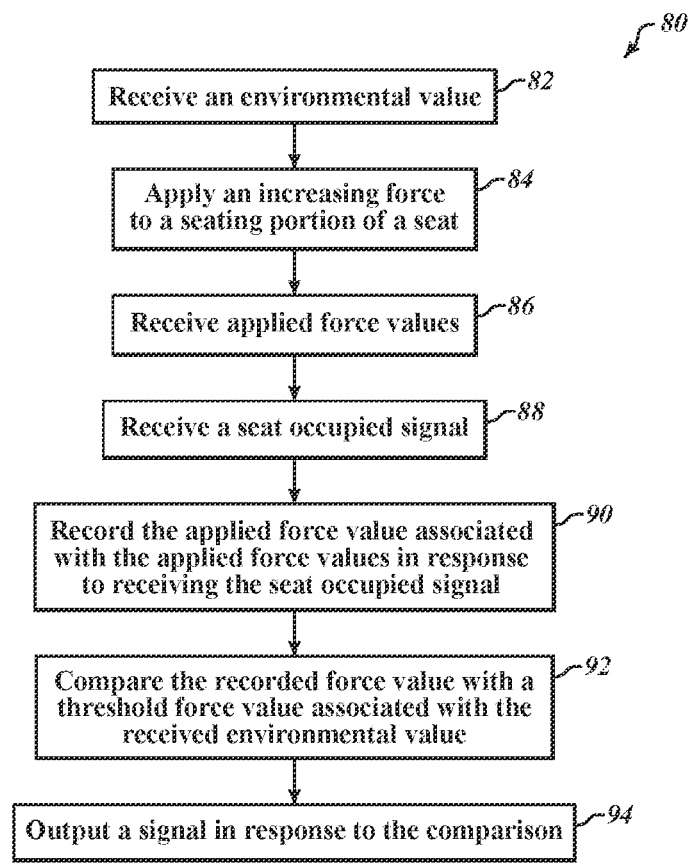
FIG. 3 is a flow diagram of an illustrative method for testing a seat sensor.

Referring additionally to FIG. 3, an illustrative process 80 may be performed for testing operation of occupant detection sensors functioning for seats. At a block 82, the process 80 receives an environmental value from an environmental sensor. At a block 84, the process 80 applies increasing forces to a seat portion of a seat. The magnitude of sequential ones of the forces increases over time. At a block 86, the process 80 receives applied force values. At a block 88, the process 80 receives a seat occupied signal from an occupant detection sensor of the tested seat. At a block 90, the process 80 records the applied force value associated with the applied force values in response to receiving the seat occupied signal. At a block 92, the process 80 compares the recorded applied force value with a threshold force value associated with the received environmental value. At a block 94, the process 80 outputs a signal in response to the comparison.

In some embodiments, a pass signal is outputted in response to the recorded force value being greater than a lower threshold force value associated with the received environmental value and less than an upper threshold force value associated with the received environmental value.

In some embodiments, a fail signal is outputted in response to the recorded force value being less than the lower threshold force value.

In some embodiments, a fail signal is outputted in response to the recorded force value being greater than the upper threshold force value.

In some embodiments, the environmental value includes an environmental value chosen from a temperature value and a humidity value.

In some embodiments, seat material information is received. The threshold force value is adjusted in response to the received seat material information.

Figure 4:
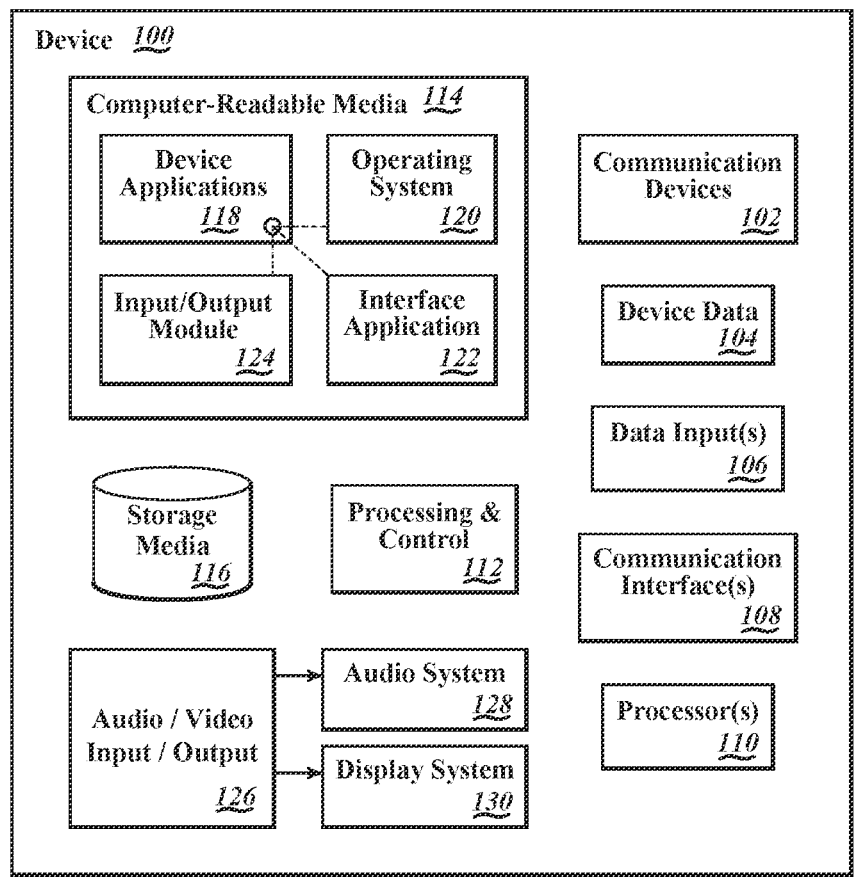
FIG. 4 is a block diagram of a computing device used in the system of FIG. 1.

Referring additionally to FIG. 4, various components of a device 100 can be implemented as any type of computing device as described with reference to FIGS. 1 and 3 to implement embodiments of the techniques described herein. In various embodiments the device 100 includes communication devices 102 that enable wired and/or wireless communication of device data 104 (e.g., received data, data that is being received, data scheduled for broadcast, data packets that includes the data, etc.). The device data 104 or other device content can include configuration settings of the device, media content stored on the device, and/or information associated with a user of the device and/or devices under test. Media content stored on the device 100 can include any type of audio, video, and/or image data. The device 100 includes one or more data inputs 106 via which any type of data, media content, and/or inputs can be received, such as user-selectable inputs, messages, music, television media content, recorded video content, and any other type of audio, video, and/or image data received from any content and/or data source.

In various embodiments the device 100 may also include communication interfaces 108 that can be implemented as any one or more of a serial and/or parallel interface, a wireless interface, any type of network interface, a modem, and as any other type of communication interface. In such embodiments the communication interfaces 108 may provide a connection and/or communication links between the device 100 and a communication network by which other electronic, computing, and communication devices communicate data with the device 100.

In various embodiments the device 100 may include one or more processors 110 (e.g., any of microprocessors, controllers, and the like) which process various computer-executable instructions to control the operation of the device 100 and can help to implement embodiments of the techniques described herein. Alternatively, or in addition, the device 100 can be implemented with any one or combination of hardware, firmware, or fixed logic circuitry that is implemented in connection with processing and control circuits 112. Although not shown, the device 100 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

In various embodiments, the device 100 may also include computer-readable media 114, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The device 100 can also include a mass storage media device 116.

The computer-readable media 114 provides data storage mechanisms to store the device data 104, as well as various device applications 118 and any other types of information and/or data related to operational aspects of the device 100. For example, an operating system 120 can be maintained as a computer application with the computer-readable media 114 and executed on processors 110. The device applications 118 can include a device manager (e.g., a control application, software application, signal processing and control module, code that is native to a particular device, a hardware abstraction layer for a particular device, etc.). The device applications 118 also include any system components or modules to implement embodiments of the testing techniques described herein. In this example, the device applications 118 include an interface application 122 and an input/output module 124 that are shown as software modules and/or computer applications. The input/output module 124 is representative of software that is used to provide an interface with a device configured to capture inputs, such as a touchscreen, track pad, camera, microphone, and so on. Alternatively, or in addition, the interface application 122 and the input/output module 124 can be implemented as hardware, software, firmware, or any combination thereof. Additionally, the input/output module 124 may be configured to support multiple input devices, such as separate devices to capture visual and audio inputs, respectively.

In various embodiments the device 100 may also include an audio and/or video input-output system 126 that provides audio data to an audio system 128 and/or provides video data to a display system 130. The audio system 128 and/or the display system 130 can include any devices that process, display, and/or otherwise render audio, video, and image data. Video signals and audio signals can be communicated from the device 100 to an audio device and/or to a display device via an RF (radio frequency) link, S-video link, composite video link, component video link, DVI (digital video interface), analog audio connection, or other similar communication link. In an embodiment, the audio system 128 and/or the display system 130 are implemented as external components to the device 100.

Alternatively, the audio system 128 and/or the display system 130 may be implemented as integrated components of the device 100.

Those skilled in the art will recognize that at least a portion of the processors, controllers, components, devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interactive devices (e.g., a touch pad, a touch screen, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In some such examples, at the time the controller is configured to carry out the second purpose, the controller may no longer be capable of carrying out that first purpose until it is reconfigured. A controller may switch between configurations as different components/modules in as little as a few nanoseconds. A controller may reconfigure on-the-fly, e.g., the reconfiguration of a controller from a first controller into a second controller may occur just as the second controller is needed. A controller may reconfigure in stages, e.g., portions of a first controller that are no longer needed may reconfigure into the second controller even before the first controller has finished its operation. Such reconfigurations may occur automatically, or may occur through prompting by an external source, whether that source is another component, an instruction, a signal, a condition, an external stimulus, or similar.

For example, a central processing unit or the like of a controller may, at various times, operate as a component/module for displaying graphics on a screen, a component/module for writing data to a storage medium, a component/module for receiving user input, and a component/module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components/modules, the example includes the possibility that the same hardware may implement more than one of the recited components/modules, either contemporaneously or at discrete times or timings. The implementation of multiple components/modules, whether using more components/modules, fewer components/modules, or the same number of components/modules as the number of components/modules, is merely an implementation choice and does not generally affect the operation of the components/modules themselves. Accordingly, it should be understood that any recitation of multiple discrete components/modules in this disclosure includes implementations of those components/modules as any number of underlying components/modules, including, but not limited to, a single component/module that reconfigures itself over time to carry out the functions of multiple components/modules, and/or multiple components/modules that similarly reconfigure, and/or special purpose reconfigurable components/modules.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:
1. A device comprising:
a processor; and
a memory configured to store computer-executable instructions configured to cause the processor to:
receive an environmental value;
send instructions to apply increasing forces to a seat portion of a seat, magnitude of sequential ones of the forces increasing over time;
receive applied force values from a force applicator;
receive a seat occupied signal from a seat sensor;
record the applied force value associated with the applied force values in response to receiving the seat occupied signal;
compare the recorded force value with a threshold force value associated with the received environmental value; and
output a signal in response to the comparison.

2. The device of claim 1, wherein the memory is further configured to store computer-executable instructions configured to cause the processor to:
output a pass signal responsive to the recorded force value being greater than a lower threshold value associated with the received environmental value and less than an upper threshold value associated with the received environmental value.

3. The device of claim 2, wherein the lower threshold value and the upper threshold value are inversely proportional to the environmental value.

4. The device of claim 2, wherein the memory is further configured to store computer-executable instructions configured to cause the processor to:
output a fail signal responsive to the recorded force value being less than the lower threshold value.

5. The device of claim 4, wherein the memory is further configured to store computer-executable instructions configured to cause the processor to:
output a fail signal responsive to the recorded force value being greater than the upper threshold value.

6. The device of claim 1, wherein the environmental value is chosen from a temperature value and a humidity value.

7. The device of claim 1, wherein:
the memory is further configured to store computer-executable instructions configured to cause the processor to:
receive seat material information; and
the threshold value is further associated with the received seat material information.

8. A system comprising:
an environmental sensor configured to generate an environmental value;
a force applicator configured to:
apply increasing forces to a seat portion of a vehicle seat, magnitude of sequential ones of the forces increasing over time; and
generate applied force values associated with the applied increasing forces;
a processor configured to communicate with the environmental sensor, the force applicator, and an occupant detection sensor in the vehicle seat;
a memory configured to communicate with the processor, the memory configured to store computer-executable instructions configured to cause the processor to:
receive the environmental value;
receive the generated applied force values from the force applicator;
receive a seat occupied signal from the occupant detection sensor;

record the applied force value associated with the received applied force values in response to receiving the seat occupied signal;
compare the recorded force value with a threshold value associated with the received environmental value; and
generate an output signal in response to the comparison; and
an output device configured to output the generated output signal.

9. The system of claim 8, wherein the memory is further configured to store computer-executable instructions configured to cause the processor to:
output a pass signal responsive to the recorded force value being greater than a lower threshold value associated with the received environmental value and less than an upper threshold value associated with the received environmental value.

10. The system of claim 9, wherein the lower threshold value and the upper threshold value are inversely proportional to the environmental value.

11. The system of claim 9, wherein the memory is further configured to store computer-executable instructions configured to cause the processor to:
output a fail signal responsive to the recorded force value being less than the lower threshold value.

12. The system of claim 11, wherein the memory is further configured to store computer-executable instructions configured to cause the processor to:
output a fail signal responsive to the recorded force value being greater than the upper threshold value.

13. The system of claim 8, wherein the environmental value is chosen from a temperature value and a humidity value.

14. The system of claim 8, wherein:
the memory is further configured to store computer-executable instructions configured to cause the processor to:
receive seat material information; and
the threshold value is further associated with the received seat material information.

15. A method comprising:
receiving an environmental value;
applying increasing forces to a seat portion of a seat, magnitude of sequential ones of the forces increasing over time;
receiving applied force values;
receiving a seat occupied signal;
recording the applied force value associated with the applied force values in response to receiving the seat occupied signal;
comparing the recorded force value with a threshold force value associated with the received environmental value; and
outputting a signal in response to the comparison.

16. The method of claim 15, wherein outputting the signal in response to the comparison includes:
outputting a pass signal responsive to the recorded force value being greater than a lower threshold force value associated with the received environmental value and less than an upper threshold force value associated with the received environmental value.

17. The method of claim 16, wherein outputting the signal in response to the comparison further includes:
outputting a fail signal responsive to the recorded force value being less than the lower threshold force value.

18. The method of claim 17, wherein outputting the signal in response to the comparison further includes:
outputting a fail signal responsive to the recorded force value being greater than the upper threshold force value.

19. The method of claim 15, wherein receiving the environmental value further includes:
receiving an environmental value chosen from a temperature value and a humidity value.

20. The method of claim 15, further comprising:
receiving seat material information; and
adjusting the threshold force value responsive to the received seat material information.

* * * * *